(12) United States Patent
Binder

(10) Patent No.: US 10,077,685 B2
(45) Date of Patent: Sep. 18, 2018

(54) APPARATUS AND METHOD FOR THE MATERIAL-REMOVING PROCESSING OF AN ADJUSTABLE CAMSHAFT

(71) Applicant: THYSSENKRUPP PRESTA TECCENTER AG, Eschen (LI)

(72) Inventor: Thomas Binder, Feldkirch (AT)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 145 days.

(21) Appl. No.: 14/408,219

(22) PCT Filed: May 29, 2013

(86) PCT No.: PCT/EP2013/061102
§ 371 (c)(1),
(2) Date: Dec. 15, 2014

(87) PCT Pub. No.: WO2013/186054
PCT Pub. Date: Dec. 19, 2013

(65) Prior Publication Data
US 2015/0135531 A1    May 21, 2015

(30) Foreign Application Priority Data
Jun. 15, 2012  (DE) .......... 10 2012 105 230

(51) Int. Cl.
*F01L 1/047*   (2006.01)
*F01L 1/053*   (2006.01)
*F01L 13/00*   (2006.01)

(52) U.S. Cl.
CPC .............. *F01L 1/047* (2013.01); *F01L 1/053* (2013.01); *B23P 2700/02* (2013.01);
(Continued)

(58) Field of Classification Search
CPC ........ B23P 2700/021; F01L 2013/0052; F01L 2810/02; Y10T 29/49293
See application file for complete search history.

(56) References Cited

U.S. PATENT DOCUMENTS

2008/0170816 A1* 7/2008 Ueno ............... F01L 1/047
384/418
2009/0223049 A1* 9/2009 Binder ............... B24B 19/12
29/888.1

(Continued)

FOREIGN PATENT DOCUMENTS

CN   101595281 A   12/2009
DE   102004021376 A1   12/2005
(Continued)

OTHER PUBLICATIONS

German Language International Search Report for International patent application No. PCT/EP2013/061102; dated Oct. 7, 2013.
(Continued)

*Primary Examiner* — Christopher Besler
(74) *Attorney, Agent, or Firm* — thyssenkrupp North America, Inc.

(57) ABSTRACT

The invention relates to a method for the material-removing processing of an adjustable camshaft which has a shaft body, wherein at least a first component of the camshaft can move axially and/or in the circumferential direction with respect to the shaft body, wherein a gap which permits the movement is provided between the shaft body and the first component, and wherein in order to protect the first moveable component during the material-removing processing a protection apparatus which has at least one fluid duct is placed on the shaft body and fluid is applied to it. According to the invention, the protection apparatus is arranged laterally with respect to the first moveable component in such a way that at least some of the fluid is directed laterally onto the first (Continued)

component and into an intermediate space between the protection apparatus and the first component, and wherein the first component is exposed in the radial direction. The subject-matter of the invention is also an arrangement for carrying out the method.

9 Claims, 6 Drawing Sheets

(52) U.S. Cl.
CPC .............. *F01L 2001/0471* (2013.01); *F01L 2013/0052* (2013.01); *F01L 2810/02* (2013.01); *Y10T 29/49293* (2015.01)

(56) References Cited

U.S. PATENT DOCUMENTS

| | | |
|---|---|---|
| 2012/0079913 A1 | 4/2012 | Dollinger et al. |
| 2012/0279467 A1 | 11/2012 | Scherzinger et al. |

FOREIGN PATENT DOCUMENTS

| | | |
|---|---|---|
| DE | 102004058622 A1 | 6/2006 |
| DE | 202006020697 U | 7/2009 |
| DE | 102009024455 A1 | 1/2011 |
| DE | 102009057633 B3 | 3/2011 |
| DE | 102010022708 A1 | 12/2011 |
| EP | 1989021 B1 | 11/2009 |
| JP | 2010060062 A | 3/2010 |

OTHER PUBLICATIONS

English Translation of International Search Report for International patent application No. PCT/EP2013/061102; dated Oct. 7, 2013.
English translation of abstract of counterpart application No. DE 102006008532 (A1) to EP1989021 (B1). Note English abstract of EP1989021 (B1) was not available.
English translation of abstract of DE 102004021376 (A1).
English translation of abstract of DE 102004058622 (A1).
English translation of abstract of JP 2010060062 (A).
English translation of abstract of DE 102010022708 (A1).

\* cited by examiner

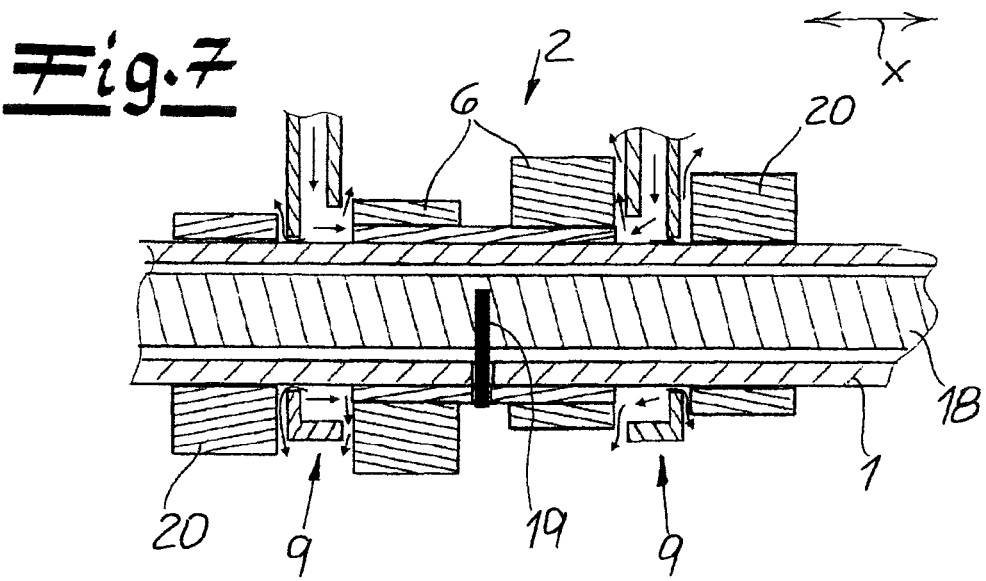
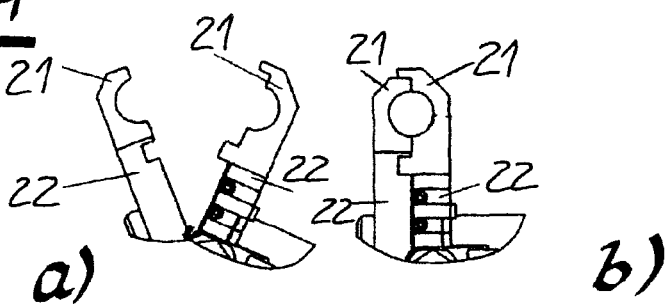
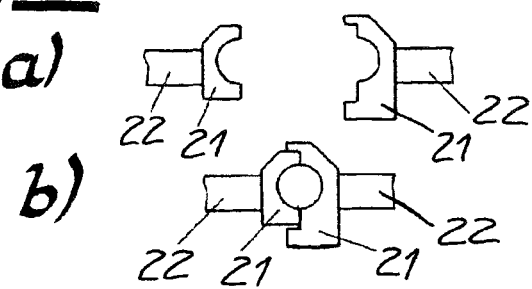

APPARATUS AND METHOD FOR THE MATERIAL-REMOVING PROCESSING OF AN ADJUSTABLE CAMSHAFT

CROSS REFERENCE TO RELATED APPLICATIONS

This application is a U.S. National Stage Entry of International Patent Application Serial Number PCT/EP2013/061102, filed May 29, 2013, which claims priority to German patent application no. DE 102012105230.1, filed Jun. 15, 2012.

FIELD

The invention relates to a method for the material-removing processing of an adjustable camshaft which has a shaft body, wherein at least a first component of the camshaft can move axially and/or in the circumferential direction with respect to the shaft body, wherein a gap which permits the movement is provided between the shaft body and the first component, and wherein in order to protect the first moveable component during the material-removing processing a protection apparatus which has at least one fluid duct is placed on the shaft body and fluid is applied to it. The subject-matter of the invention is also an arrangement for carrying out such a method.

BACKGROUND

A method having the described feature is known from EP 1 989 021 B1. In the camshaft described there, the shaft body forms a hollow external shaft in which an internal shaft is arranged, wherein the internal shaft can rotate with respect to the external shaft, and wherein the first component is connected in a rotationally fixed fashion to the internal shaft. A plurality of first components in the form of cams are usually connected in a rotationally fixed fashion to the internal shaft. Furthermore, second components are provided in the form of cams which are arranged on the external shaft in a rotationally and axially fixed fashion and therefore without a gap which permits a movement. By rotating the internal shaft with respect to the external shaft in a limited, predefined range it is possible to adjust the two groups of cams with respect to one another in order to permit a variable control of the valves of a motor vehicle engine. It is therefore possible, for example, to change the ratio of the inlet time to the outlet time as a function of the load and rotational speed if the inlet valves, on the one hand, and the outlet valves, on the other are activated with the different groups of cams which can be adjusted with respect to one another.

The camshaft which is described in EP 1 989 021 B1 is composed of a plurality of parts and is correspondingly also referred to as assembled camshaft. In such an assembled camshaft there is frequently the need still to process individual components after they are combined, for example in order to grind a surface to a precisely predetermined dimension. Furthermore, it may also be expedient to process the shaft body itself in a material-removing fashion and, in particular, in a cutting fashion, in order, for example, to generate a smooth surface for a sliding bearing. During such processing there is always the risk of chips or other impurities penetrating the gap, necessary for the movement, between the shaft body and the first component, which puts the functioning of this component in jeopardy. In order to reduce this risk, EP 1 989 021 B1 proposes, according to a first variant, that simple disks which are divided in two be arranged as diaphragms next to the first component in order thereby to protect the component. Although this measure is comparatively simple, the disadvantage arises that scratches and gaps may remain, as a result of which complete protection is not ensured. Furthermore, these diaphragms must also be of a suitable size in order to cover the first component to a sufficient degree. This makes the entire processing more difficult, wherein the first component cannot be processed, or at least cannot be readily processed.

According to an alternative refinement, EP 1 989 021 B1 proposes that the first component that can move with respect to the shaft body be enclosed with a capsule which completely surrounds the first component. In this context, only a small gap remains between this closed capsule and the shaft body. In order to avoid the penetration of chips or other impurities into the capsule, fluid can be applied thereto. The fluid emerging from the gap between the capsule and the shaft body effectively prevents the ingress of chips and other impurities into the capsule. As a result of the encapsulation of the moveable first component, the latter is completely covered and can accordingly no longer be processed itself either. Furthermore, the capsule must be of a considerable size so that it can accommodate the first moveable component in its interior. This can also make the processing of the other components of the camshaft more difficult.

In addition to adjustable camshafts with an internal shaft and an external shaft, camshafts are also known in which a cam pack is arranged as a first moveable component on the shaft body in a rotationally fixed but axially displaceable fashion. Such displaceability in the axial direction can be made possible, for example, by a multi-tooth profile which extends in the longitudinal direction of the shaft body, wherein the cam pack then has, as a first moveable component, a complementary hub. Such longitudinally displaceable components in the form of cam packs can also be used for adjustment. It is therefore possible, for example, to change the position of the tip of the cam and/or the pitch of the edges of the cam in the longitudinal direction. Finally, there is even the possibility of deactivating a valve by means of longitudinal displacement by virtue of a corresponding shape of the camshaft if the corresponding cylinder is also deactivated in a partial load. Corresponding refinements of assembled camshafts are known from DE 10 2009 057 633 B3, DE 10 2010 022 708 A1 and DE 10 2009 024 455 A1.

BRIEF DESCRIPTION OF THE DRAWINGS

The present disclosure is described in detail below with reference to the attached drawing figures, wherein:

FIG. 7 is a partial longitudinal cross sectional view of an embodiment of a protection apparatus of the present disclosure engaged with an alternate embodiment of a camshaft having a shaft body in the form of an external shaft and a cam pack arranged rotatably thereon.

FIGS. 9a and 9b are side detail views of a protection apparatus of the device of FIG. 8 in each of a respective open state and a closed state.

FIGS. 10a and 10b are side detail views of an alternate embodiment of the protection apparatus of the device of FIG. 8 in each of a respective open state and a closed state.

DETAILED DESCRIPTION

Figure 1:
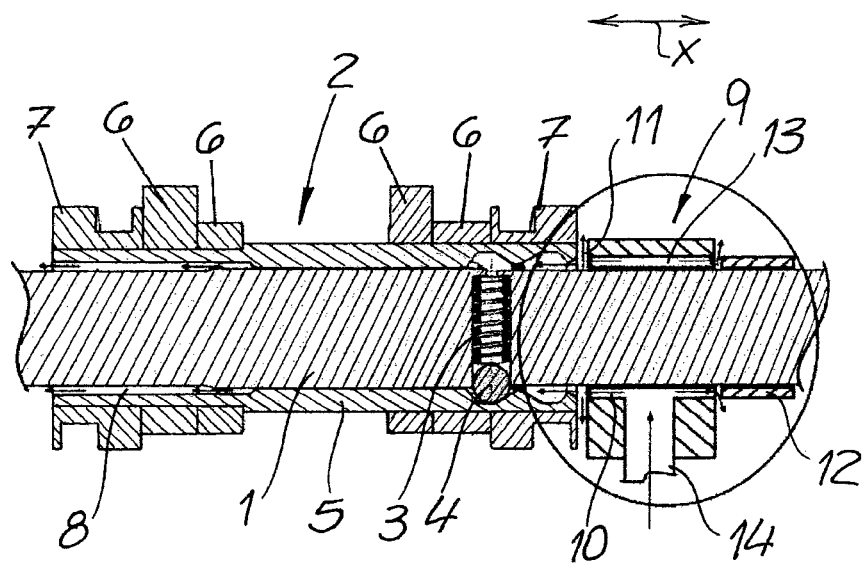
FIG. 1 is a partial longitudinal cross sectional view of an embodiment of a protection apparatus of the present disclosure that is engaged on a camshaft and positioned adjacent to a cam pack disposed on the cam shaft, which cam pack can be displaced in an axial direction of the cam shaft.

The present invention is based on the object of specifying a method which has the features described at the beginning and which permits simple and uncomplicated processing of the components of a camshaft, wherein the gap which is present between the first component and the shaft body and permits the movement of the first component is reliably protected.

A method of the present disclosure includes laterally arranging a protection apparatus as disclosed herein adjacent a first moveable component, wherein the arrangement is such that at least some of the fluid is directed laterally onto the first component and into an intermediate space between the protection apparatus and the first component, and wherein the first component is exposed in the radial direction along at least a part of its length.

Since the first component is exposed in the radial direction along at least a part of its length, it can also be processed according to requirements. The present invention is based on the realization that the described application of fluid permits effective protection without the first component being completely covered or separated off. The selective application of the fluid ensures that precisely the gap, necessary for the movement, between the first component and the shaft body is protected. Within the scope of the invention, the first component can be exposed in the radial direction over its entire length viewed in the axial direction of the shaft body. Furthermore, it is, however, also possible that the protection apparatus is arranged laterally with respect to the first moveable component but also projects over an edge of the component in the axial direction. The protection of the edge of the first component can therefore still be improved, but, on the other hand, the geometry of the protection apparatus also has to be adapted to the contour of the first component at its assigned edge. However, in the region which is still exposed in the radial direction, further processing is then still possible.

In addition to the advantage that the first component can be processed, the protection apparatus according to the invention can also be much more compact than the design known from the prior art. All that has to be ensured is that the fluid is directed laterally onto the first component, as a result of which this region to which fluid is applied is kept free of contamination. Ultimately, a compact design also makes it easier to process the other components because they are more easily accessible.

The at least one first moveable component is preferably a cam, a cam pack or the like. Furthermore, the camshaft can, however, also have further components which are connected to the shaft body in an axially and rotationally fixed fashion.

Furthermore, it is also possible to form further functional elements of the shaft body from sections of the shaft body itself. It is therefore possible, for example, to generate a bearing seat by means of surface processing on the shaft body itself. It is also even possible to use a shaping method to generate cams or other functional elements from the material of the shaft body. The configuration of such further functional elements, which are not moveable with respect to the shaft body, is not restricted within the scope of the invention.

The material-removing processing usually takes place in a cutting fashion, wherein this processing can take place with a geometrically defined cutting edge or with a geometrically undefined cutting edge. Material-removing methods with a geometrically defined cutting edge are, for example, turning or milling. Grinding and honing are methods with a geometrically undefined cutting edge.

Within the scope of the invention it is not excluded that the at least one first component or even other components or sections of the shaft are additionally also processed before the assembly of the camshaft. However, the subsequent processing of the camshaft can effectively reduce deviations of shape and position. It is to be borne in mind here that owing to the moveability of the individual parts and as a result of dimensional deviations on the individual parts the tolerances can add up to a considerable value. In particular, when the camshaft is used the precise orientation of the individual functional elements with respect to one another is also decisive. It is therefore necessary, for example, for the profile of a cam to be oriented correctly not only with respect to the shaft but also with respect to the arrangement of a bearing formed on the shaft.

The protection apparatus is expediently moved right up to an end face of the first component so that the application of the fluid allows a sufficient flow of fluid and a sufficient excess pressure to be achieved in order to reliably carry away chips or other contamination. The end face of the first component can extend radially outward here from the gap formed between the first component and the shaft body. If the end face of the first component and an assigned end face of the protection apparatus are oriented precisely parallel, a gap with a constant width, running in the radial direction, is produced between the first component and the protection apparatus around the entire circumference of the shaft body, through which gap the fluid is carried outward and thereby carries along contamination. It is basically also possible for the protection apparatus to be arranged to a side of the first component, but still to cover an edge of the first component. In contrast to the configuration described above, an essentially horizontal gap is then formed between the edge of the first component and the protection apparatus, wherein the covered edge of the first component is also protected. However, it is decisive that fluid also continues to be applied particularly to the end face of the first component and to the gap formed between the first component and the shaft body, and said end face and gap are therefore protected. In the case of partial coverage of the edge region, improved protection is obtained there if the edge region itself no longer has to be processed. On the other hand, the protection apparatus can no longer be embodied in such a compact fashion as before, wherein precise adaptation of the contour of the protection apparatus to the contour of the first component at the assigned edge is also necessary.

A parallel orientation of the end faces, which face one another, of the first component and of the protection apparatus is, however, not absolutely necessary within the scope of the invention. Even in the case of a profile which is oblique or non-uniform around the circumference, reliable protection can be achieved by means of the fluid given a suitable through-flow quantity.

In particular, the protection apparatus can have at least one projection on its face facing the first component, wherein the first component is supported on the projection during the material-removing processing. This projection then serves as a type of spacer element, as a result of which the intermediate space between the protection apparatus and the first component is precisely predefined. Since fluid flows around the projection effective protection can be achieved against the ingress of contamination despite the, in places, direct bearing of the first component on the protection apparatus.

The projection is preferably embodied in such a way that only punctiform bearing occurs, in order to avoid shadowing with the respect to the flow of fluid and to ensure that the fluid flows around uniformly. Alternatively, the first component can also be equipped with a corresponding projection as a spacer element. In order to avoid tilting during the bearing, a plurality of projections can also be provided around the circumference on the first component and/or the protection apparatus.

The gap, which permits the movement, between the first component and the shaft body can be kept free of contamination by the fluid flow which flows outward between the first component and the protection apparatus. It is to be borne in mind here that this gap opens in the longitudinal direction of the camshaft on both sides of the first component. Correspondingly, within the scope of the invention it is possible to provide that a protection apparatus is arranged on each of these two sides of the first component, that is to say in front of and behind the first component when viewed in the axial direction.

However, according to an alternative embodiment of the method according to the invention it may also be sufficient to protect the entire first component against the ingress of contamination with just one protection apparatus. In this context, a partial flow of the fluid from the protection apparatus can be directed into the gap between the first component and the shaft body in such a way that this partial flow flows through the gap and exits the gap on the side face of the first component lying opposite the protection apparatus. On this side of the component, the gap which permits the movement is therefore then protected in that the partial flow of the fluid is blown out of this gap and thereby prevents the ingress of contamination in the form of chips or the like.

Such a method is possible in particular if a sufficiently large gap remains between the first component and the shaft body. For the purpose of ventilation, it is also possible to provide, on the basis of a complementary shape of the shaft body and the first component, ventilation ducts running in the longitudinal direction, in order to permit an effective through-flow.

The subject matter of the invention is also an arrangement for carrying out the described method having a device for material-removing processing and having an adjustable camshaft. The adjustable camshaft has a shaft body and at least a first component which can move axially and/or in the circumferential direction with respect to the shaft body. Within the scope of the invention, the camshaft can already be completely mounted. However, it is alternatively also possible that individual parts are also subsequently added in order to complete the camshaft. The device comprises at least one protection apparatus which has at least one fluid duct. According to the invention, the protection apparatus is arranged laterally with respect to the first moveable component in such a way that the first component is exposed in the radial direction.

As has already been described in relation to the method according to the invention, an external profile of the shaft body can form, with an internal profile of the first component arranged thereon, a longitudinal guide along the longitudinal axis of the shaft body. In this context, a complementary multi-tooth profile is particularly preferred in which the torque which acts in the circumferential direction is transmitted via a plurality of teeth. However, depending on the loading a simple guide groove with an assigned projection may also be sufficient.

According to one alternative embodiment of the arrangement, the shaft body forms a hollow external shaft of the camshaft, in which external shaft an internal shaft is arranged, wherein the internal shaft can be rotated with respect to the external shaft, and wherein the first component is connected in a rotationally fixed fashion to the internal shaft. The angular range for the rotation is usually predefined and limited here by end stops. Finally, oblique or spiral-shaped guides can also be provided on the shaft body in order to bring about a combined axial and radial movement. Irrespective of the type of movement, a gap which permits the movement must remain between the shaft body and the at least one first component arranged thereon.

In order to be able to insert the shaft body with the components arranged thereon into the device, the protection apparatus is preferably formed from two elements which can move with respect to one another and which can be, in particular, in the form of half-shells and which can be fitted in the manner of tongs onto the shaft body.

A fluid is applied to the protection apparatus, that is to say a fluid flows through said protection apparatus and exits the protection apparatus at least on the side which is directed in the direction of the first component to be protected.

Taking this as a basis, various embodiments for the protection apparatus are produced. Therefore, an annular duct can be formed between the shaft body and the protection apparatus, which annular duct opens both on the side of the protection apparatus facing the first component and on the side of the protection apparatus lying opposite the first component, and which annular duct is connected to a fluid feed line. The fed-in fluid is then divided into two annular partial flows within the protection apparatus, wherein one partial flow is directed onto the first component to be protected and wherein the second partial flow exits the protection apparatus on the side lying opposite. With such an embodiment, the protection apparatus can be used in a universal fashion and can be arranged, in particular, in front of or behind a component to be protected, when viewed in the axial direction. Furthermore, the depositing of contamination in the form of chips or the like can also be avoided on both sides of the protection apparatus. However, it has to be accepted that only part of the fluid flow is available for the protection of the first component.

According to one alternative embodiment, an annular duct is formed between the shaft body and the protection apparatus, which annular duct opens merely on the side of the protection apparatus facing the first component and is connected to a fluid feed line. Within the scope of such an embodiment, the entire fluid flow or the greater part of the fluid flow is directed onto the first component to be protected. It is necessary to bear in mind here that at least a narrow gap also remains between the protection apparatus and the shaft body on the side of the protection apparatus lying opposite the first component. If the corresponding leakage flows are low, this restriction is acceptable.

In the two variants described, the fluid is directed onto the first component to be protected or the gap running between the first component and the shaft body, immediately at the external face of the shaft body.

In order to bring about exiting a fluid from the protection apparatus further toward the outside in the radial direction, according to a further alternative embodiment there is provision that an annular duct is formed within the protection apparatus, which annular duct opens on the side of the protection apparatus facing the first component and is connected to the fluid feed line, already described above.

The fluid feed line usually extends away from the shaft body approximately in the radial direction. If the protection apparatus is formed from two elements in the form of half-shells which can move with respect to one another, the fluid feed line can run, for example, in one of two supporting arms on which the elements of the protection apparatus which can move with respect to one another are secured.

The present disclosure will be explained below with reference to drawings illustrating exemplary embodiments.

FIG. 1 shows a detail of a camshaft which has a shaft body 1 and at least a first component 2, in the form of a cam pack, which is moveably arranged on the shaft body 1. Within the scope of the embodiment in FIG. 1, the first component 2 can be adjusted axially in a longitudinal direction x of the shaft body 1, for which purpose the shaft body 1 has toothing profiles on its external circumference, and the first component 2 has toothing profiles on its internal circumference, which toothing profiles are not illustrated in detail. In order to be able to secure the first component 2, which can move in the longitudinal direction x, in two different functional positions, the shaft body 1 has a transverse bore in which a ball 4, acted on by a spring 3, is arranged.

The first component 2 has an essentially tubular carrier 5 which is arranged on the shaft body 1, and cam elements 6 which are attached thereto. The first component 2 can be adjusted by means of end-side adjustment elements 7.

So that the first component 2 is moveable with respect to the shaft body 1 in the longitudinal direction x, a gap 8 which permits the movement must remain between the first component 2 and the shaft body 1. This results in the problem that this gap 8 must not be contaminated during processing of the camshaft because otherwise satisfactory functioning of the first component 2 is put at risk.

In order to protect the first moveable component 2 during material-removing processing, in particular cutting processing, a protection apparatus 9 is fitted onto the shaft body 1 and arranged laterally with respect to the first component 2 in such a way that at least some of a fluid flow, indicated by arrows, is directed through a fluid duct 10 laterally onto the first component 2 and into an intermediate space 11 between the protection apparatus 9 and the first component 2.

The protection apparatus 9 is arranged on a longitudinal section of the shaft body 1 which is free of further functional elements. Material-removing processing of the entire first component 2 is possible by means of the described arrangement of the protection apparatus 9, because said first component 2 is exposed in the radial direction. Furthermore, it is, however, also possible to process further components, for example a bearing bushing 12 which is illustrated in FIG. 1. The fluid flow makes it possible to avoid chips or other contamination occurring during the material-removing processing from being able to enter the intermediate space 11 and the gap 8.

Furthermore, FIG. 1 shows that in the arrangement illustrated there a partial flow of the fluid is directed from the protection apparatus 9 into the gap 8 between the first component 2 and the shaft body 1 in such a way that this partial flow flows through the entire gap 8 and exits the gap 8 at an end face of the first component 2 lying opposite the protection apparatus 9. In this way, the ingress of contamination into the gap 8 can also be avoided on this side of the first component facing away from the protection apparatus 9.

According to FIG. 1, an annular duct 13 is formed between the shaft body 1 and the protection apparatus 9, which annular duct 13 opens both on the side of the protection apparatus 9 facing the first component 2 and on the side of the protection apparatus 9 lying opposite the first component 2, and which annular duct 13 connects or is connected to a fluid feed line 14. In such an embodiment of the protection apparatus 9, depositing or ingress of contamination is prevented on both sides. Such a protection apparatus 9 can be arranged on the left or the right with respect to the illustration according to FIG. 1, that is say in front of or behind the first component 2 when viewed in the axial direction.

Figure 2:
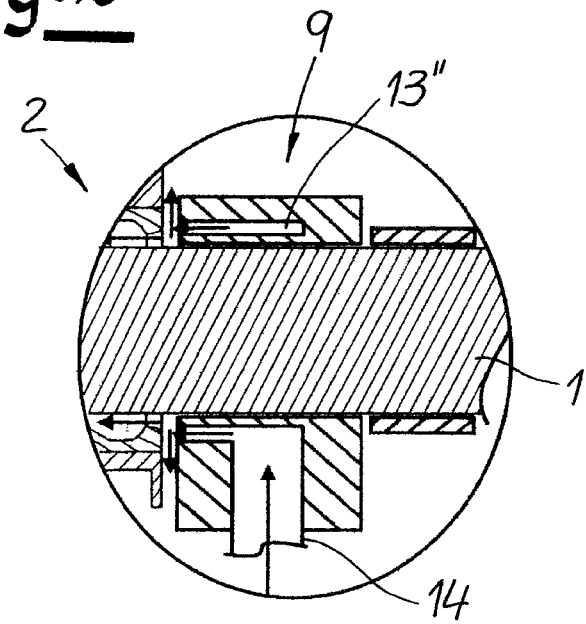
Figure 3:
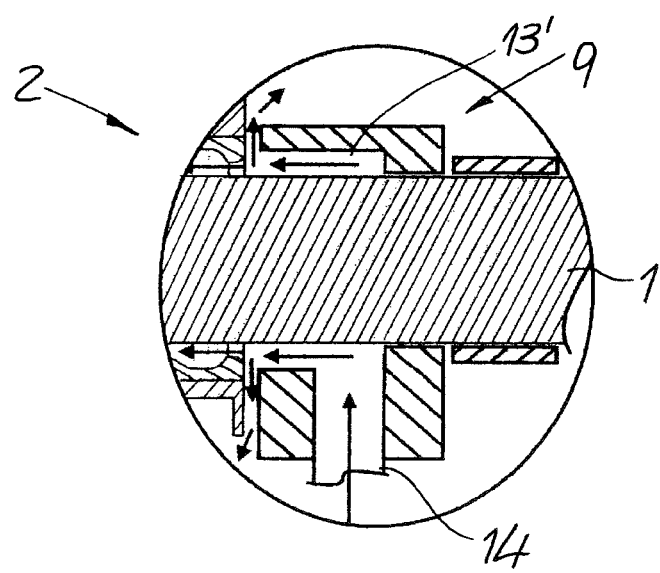

FIGS. 2 and 3 show a detail from FIG. 1 with a refined embodiment of the protection apparatus 9. According to FIG. 3, an annular duct 13' is formed between the shaft body 1 and the protection apparatus 9, which annular duct 13' opens merely on the side of the protection apparatus 9 facing the first component 2, and which annular duct 13' is connected to a fluid feed line 14. The embodiment according to FIG. 3 ensures that the entire fluid flow is directed onto the first component 2. On the side lying opposite, only a very narrow gap remains between the shaft body 1 and the protection apparatus 9, which gap permits only a small amount of fluid to pass through. As a result of the improved utilization of the fluid flow, the protection can be improved in particular when there is a low fluid through-put rate.

FIG. 2 shows a further refinement in which an annular duct 13" is formed completely within the protection apparatus 9. A web remains starting from the annular duct 13", that is to say in the direction of the shaft body 1. The position of the exiting fluid can be changed and adapted to the respective requirements by means of the annular duct 13" which is located toward the outside.

Figure 4:
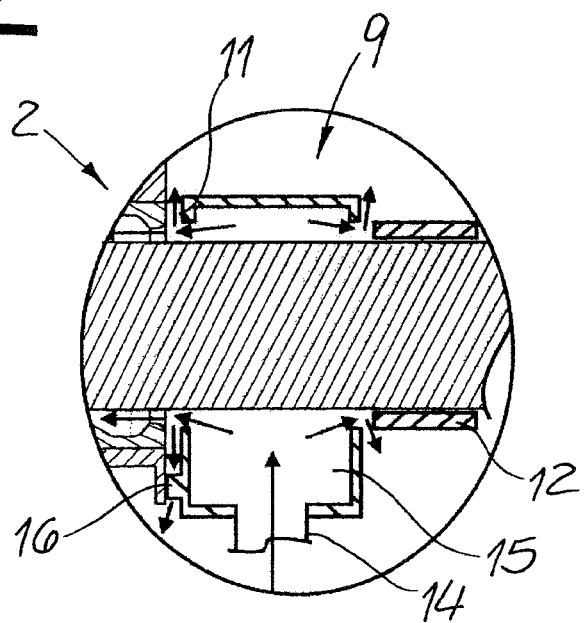
FIGS. 2-4 are detail views of alternate embodiments of the protection apparatus of FIG. 1.

Finally, FIG. 4 shows a further variant of the protection apparatus 9 in which the protection apparatus 9 has a hollow interior 15. Furthermore, the protection apparatus 9 also has a projection 16 as a spacer element, which determines the size of the intermediate space 11. Such a projection 16 can also be provided in the variants of the protection apparatus 9 described above. Otherwise, there is correspondence with the embodiment according to FIG. 1 in respect of the function.

According to FIG. 1, the side of the gap 8 facing away from the protection apparatus 9 is protected to a certain degree by a partial flow of the fluid which exits the gap 8 there. However, depending on the size and length of the gap 8, this measure is not sufficient in all cases to avoid the ingress of chips or similar contamination into the gap 8. According to FIG. 5, protection apparatuses 9 can therefore be provided on both sides of the first component 2.

Figure 6:
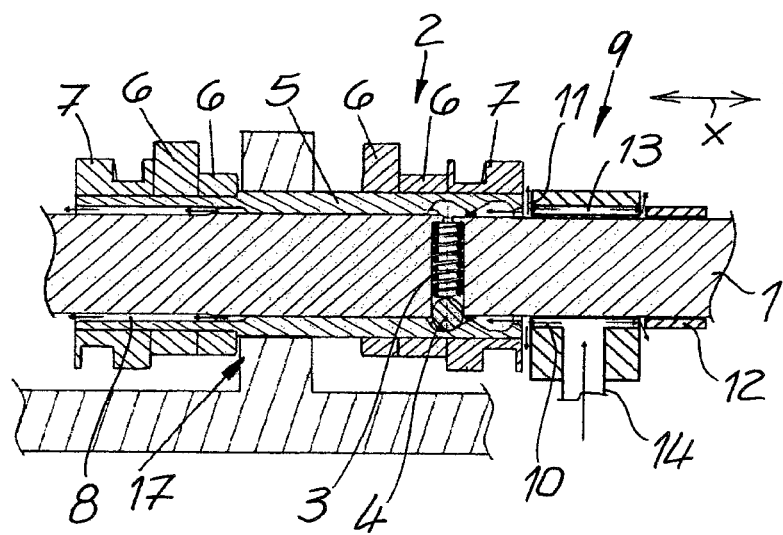
FIG. 6 is a partial longitudinal cross sectional view of an embodiment of a protection apparatus of FIG. 1, wherein the camshaft is mounted in a bearing frame.

As is indicated in FIG. 6, the camshaft can also be processed when it is already arranged in a bearing frame 17.

FIGS. 1 to 6 relate to an embodiment to which the first component 2 is moveable in a longitudinal direction x with respect to the shaft body 1. A gap 8 which permits the movement is, however, also necessary in an embodiment in which components which are adjustable in the circumferential direction are provided. FIG. 7 therefore shows an embodiment in which the shaft body 1 forms a hollow external shaft of the camshaft, in which external shaft an internal shaft 18 is arranged, wherein this internal shaft 18 can be rotated in a limited, predefined angular range with respect to the shaft body 1, and wherein the first component 2 is connected, in the form of a cam pack, in a rotationally fixed fashion to the internal shaft 18 by means of a pin 19.

Cams are located as second components 20 in front of and behind the first component 2 when viewed in the longitudinal direction x, which cams are arranged on the shaft body 1 in an axially and rotationally fixed fashion. Protection apparatuses 9 are arranged in each case in the region between the first component 2 and the respectively adjacent second component 20, wherein the protection apparatuses 9 can be configured as described above and protect the gap 8 formed between the first component 2 and the shaft body 1.

Figure 8:
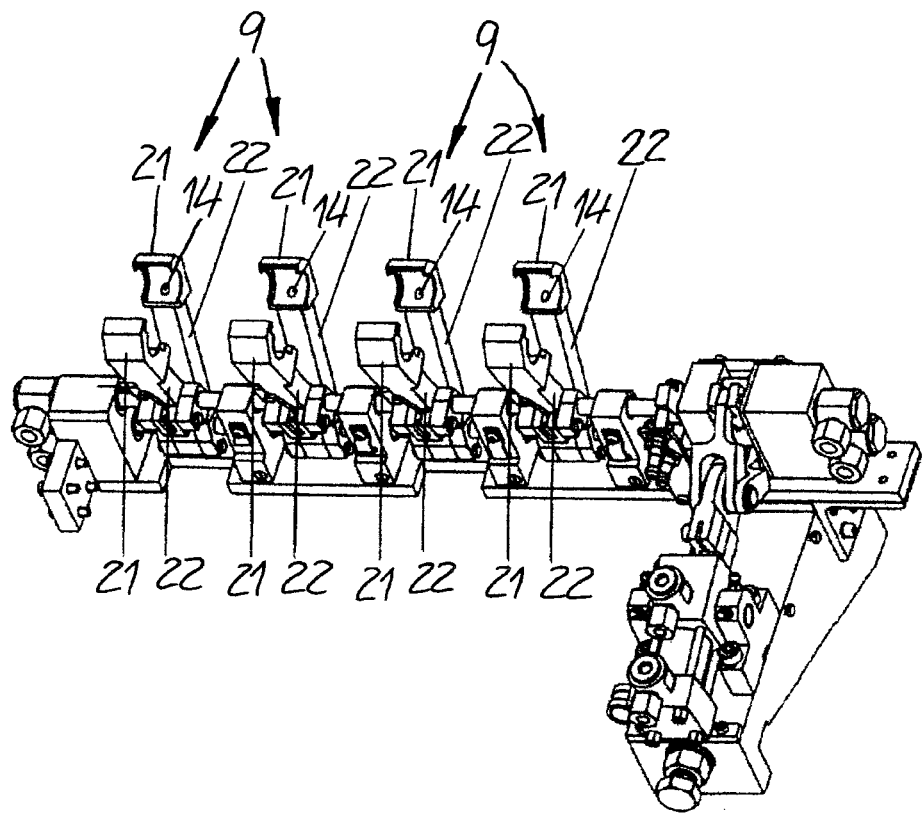
FIG. 8 is a perspective view of a device for receiving a camshaft during material-removing processing, as disclosed herein.

FIG. 8 is a schematic view of a possible embodiment of a device on which a plurality of protection apparatuses 9 are arranged in the open state. The protection apparatuses 9 are each formed from two elements 21 which can move with respect to one another and are arranged on arms 22. The protection apparatuses 9 can move from an open position (FIG. 9a) into a closed position (FIG. 9b) by means of a rotation of the arms 22 about a common attachment point. The fluid feed line 14 is expediently arranged in one of the two arms 22 here.

Instead of a rotational movement in the manner of a pair of scissors, the two elements 21 can also be opened and closed by means of a longitudinal movement, which is illustrated in FIG. 10a and FIG. 10b.

In the embodiments illustrated in FIG. 1 to FIG. 7, a distance remains in the axial direction x between the first moveable component 2 and the protection apparatus 9, with the result that the intermediate space 11 extends radially outward between the first moveable component 2 and the protection apparatus 9. The protection apparatus 9 can be configured here largely independently of the moveable component 2 and merely has to be adapted to the dimensions of the shaft body 1, wherein a very compact design is possible.

In certain circumstances it may, however, be expedient if the protection apparatus 9 is arranged laterally with respect to the first moveable component 2 but also covers an edge of this first component 2, in order to ensure increased protection there against the ingress and the depositing of contamination.

Figure 5:
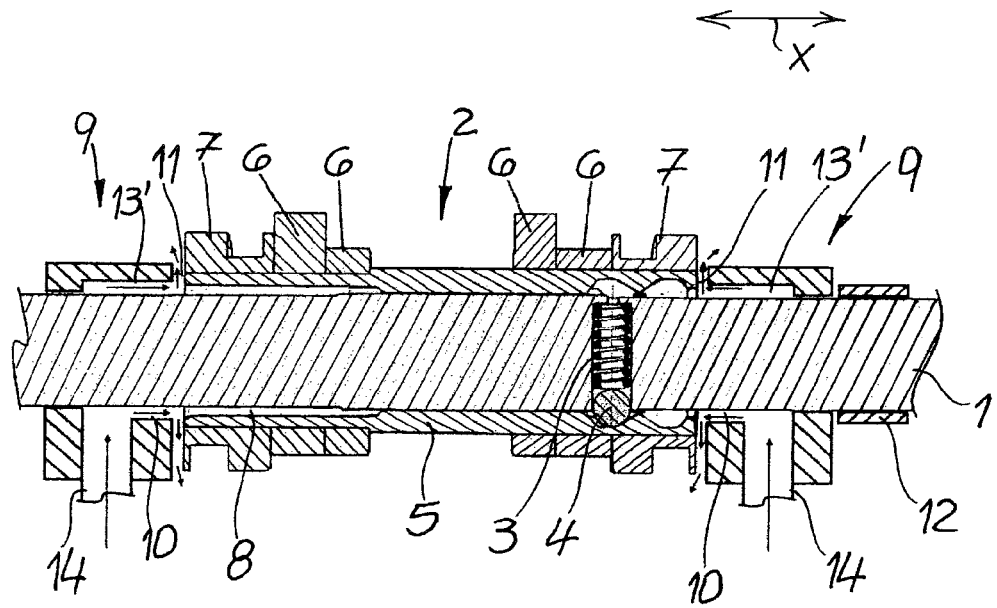
FIG. 5 is a partial longitudinal cross sectional view of the camshaft of FIG. 1 having an embodiment of a protection apparatus engaged on each end thereof, at opposite ends of the cam pack that is coupled to the cam shaft.
Figure 11:
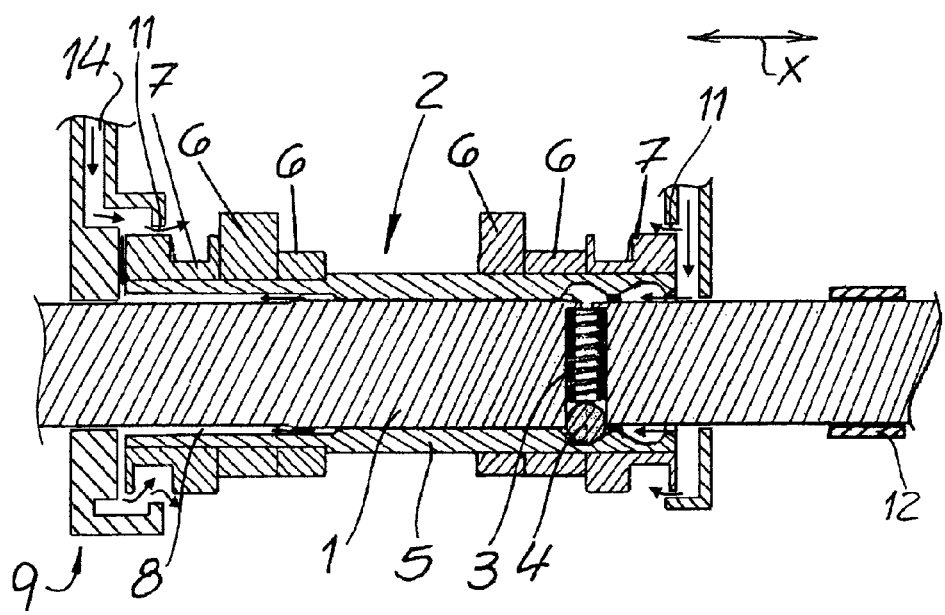
FIG. 11 is a partial longitudinal cross sectional view of alternate embodiments of a camshaft and protection apparatus of FIG. 5.

On the basis of an embodiment according to FIG. 5, FIG. 11 shows such a variant in which the end-side adjustment elements 7 of the first component 2 are still covered over a short length, as a result of which an intermediate space 11 which runs in the horizontal direction is formed. Such an embodiment is expedient particularly if the end-side adjustment elements 7 are no longer to be processed subsequently. However, the cam elements of the first component 2 continue to be exposed and can be processed from their circumferential face.

Figure 12:
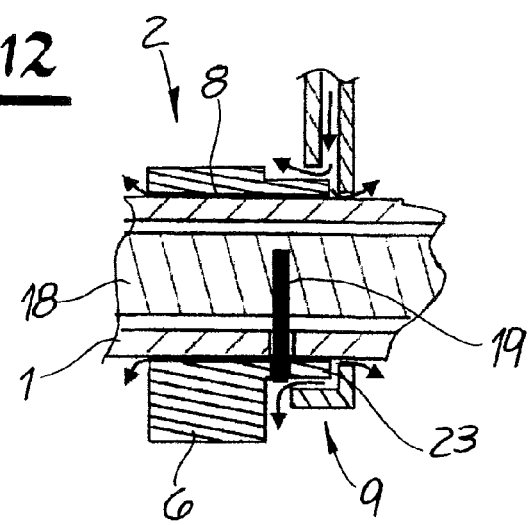
FIG. 12 is a cross sectional detail view of alternate embodiments of a camshaft and protection apparatus of FIG. 7, with just one protection apparatus.

Accordingly, FIG. 12 also shows a variant of a camshaft in which the shaft body 1 forms a hollow external shaft in which an internal shaft 18 is arranged. The illustrated cam, connected to the internal shaft 18, has, as a first component 2, a lateral collar 23 with which the first component 2 is connected in a rotationally fixed fashion to the internal shaft 18 by means of a pin 19. The protection apparatus is embodied according to FIG. 12 in such a way that the lateral collar 23 is also partially covered and thereby protected. However, the cam element 6 which is also formed by the first component 2 continues to be exposed and can be readily processed. According to FIG. 12, it continues to be ensured that fluid is also applied to the gap 8, which is necessary between the first component 2 and the shaft body 1, with the result that in the case of the comparatively short first component 2 in FIG. 12 it is sufficient to arrange the protection apparatus 9 on merely one side, wherein a portion of the fluid flows through the gap 8.

The invention claimed is:

1. A method of processing, by a material-removal process, an adjustable camshaft that includes a shaft body having at least a first component to be processed disposed thereon and defining a gap there between, which gap permits the at least first component to be one or more of axially or rotationally moveable on the shaft body of the camshaft, and a second component that is axially and rotationally fixed on the shaft body of the camshaft, the method comprising:

placing a protection apparatus on a longitudinal section of the shaft body of the camshaft, which longitudinal section is free of other elements such that the protection apparatus is disposed axially adjacent to the first component, so as to partially radially cover an outer circumferential surface of the first component along at least a part of the axial length of the first component, the protection apparatus having at least one fluid duct defined therein;

applying a flow of fluid, from the at least one fluid duct in the protection apparatus, onto the shaft body of the camshaft such that at least some of the fluid is directed laterally onto the first component and into an intermediate space defined between the protection apparatus and an exterior of the first component; and processing, by a material-removal process, the at least first component of the adjustable camshaft while said protection apparatus is placed on said shaft body and concurrently with said applying step.

2. The method of claim 1, wherein said step of placing a protection apparatus comprises:

placing a first protection apparatus on the longitudinal section of the shaft body of the camshaft so as to be disposed on a first axial side of the first component; and placing a second protection apparatus on the longitudinal section of the shaft body of the camshaft so as to be disposed on an opposing second axial side of the first component.

3. The method of claim 1, further comprising directing a partial flow of fluid from the protection apparatus into the gap between the first component and the shaft body at a first side face of the first component, such that the partial flow of fluid flows through the gap and exits the gap on a second opposing side face of the first component disposed axially opposite the first side face.

4. A method of processing, by a material-removal process, an adjustable camshaft that includes a shaft body having at least a first component to be processed disposed thereon and defining a gap therebetween, which gap permits the at least first component to be one or more of axially or rotationally moveable on the shaft body of the camshaft, the method comprising:

placing a protection apparatus, on the shaft body of the camshaft so as to be disposed axially adjacent to the first component, so as to partially radially cover an outer circumferential surface of the first component along at least a part of an axial length of the first component, the protection apparatus having at least one fluid duct defined therein and having at least one projection extending axially from a side face thereof that faces the first component, which projection is a spacer configured to abut a side face of the first component and set a minimum width of an intermediate space defined between the side face of the protection apparatus and the side face of the first component;

supporting the first component on the at least one projection;

applying a flow of fluid, from the at least one fluid duct in the protection apparatus, onto the shaft body of the camshaft such that at least some of the fluid is directed laterally onto the first component and into the intermediate space defined between the protection apparatus and the side face of the first component;

processing, by a material-removal process, the at least first component of the adjustable camshaft while said protection apparatus is placed on said shaft body and concurrently with said step of applying a flow of fluid; and washing fluid around the projection.

5. A system for carrying out the method of claim 4, comprising:

a machining device for machining the first component by a material-removal process; and the protection apparatus operatively coupled to the machining device and disposable on the shaft body of the adjustable camshaft laterally adjacent to the first component, so as to partially radially cover the outer circumferential surface of the first component along at least a part of the axial length of the first component, the protection apparatus having the at least one projection disposed on a side face thereof that faces the first component, which projection is configured to support the first component, the protection apparatus further comprising the at least one fluid duct defined therein and configured to apply the fluid flow onto the shaft body of the adjustable camshaft when the machining device is operated to machine the adjustable camshaft.

6. The system of claim 5, wherein the protection apparatus is formed from two elements which can move with respect to one another.

7. The system of claim 5, wherein an annular duct is formed between the shaft body and the protection apparatus, which annular duct opens both on a first side of the protection apparatus facing the first component and on a second side of the protection apparatus disposed opposite the first component, and which annular duct is connected to a fluid feed line.

8. The system of claim 5, wherein an annular duct is formed between the shaft body and the protection apparatus, which annular duct opens merely on a side of the protection apparatus facing the first component and is connected to a fluid feed line.

9. The system of claim 5, wherein an annular duct is formed within the protection apparatus, which annular duct opens on a side of the protection apparatus facing the first component and is connected to a fluid feed line.

* * * * *